United States Patent [19]

Sarson et al.

[11] Patent Number: 5,289,850

[45] Date of Patent: Mar. 1, 1994

[54] FLUID COUPLING HAVING VENT VALVE ASSEMBLY

[75] Inventors: Charles R. Sarson, Novelty; Thomas D. Karcher, Rocky River; John M. Weston, Columbia Station, all of Ohio

[73] Assignee: Tuthill Corporation, Berea, Ohio

[21] Appl. No.: 894,268

[22] Filed: Jun. 8, 1992

[51] Int. Cl.⁵ ............................................. F16L 55/07
[52] U.S. Cl. .................................. 137/614; 137/881; 141/289
[58] Field of Search .............. 137/614, 614.02, 614.03, 137/614.04, 614.05, 588, 589, 878, 881, 572; 141/289, 18

[56] References Cited

U.S. PATENT DOCUMENTS 2,518,299 8/1950 Fernandez .
3,817,279 6/1974 Larson ................................ 137/572
5,148,839 9/1992 Kirwan et al. .................. 137/614 X Primary Examiner—Martin P. Schwadron
Assistant Examiner—Kevin L. Lee
Attorney, Agent, or Firm—Tarolli, Sundheim & Covell

[57] ABSTRACT

A coupling for use in connecting a pair of conduits in fluid communication includes a plug assembly having a fluid flow passage therethrough and adapted to be connected with one of the conduits and a socket assembly having a fluid flow passage therethrough and adapted to be connected with another of the conduits. The coupling includes a vent valve assembly for venting of fluid pressure in the plug and socket assemblies and the conduits. The vent valve assembly includes an outlet port having a seat and a valve member biased into abutting engagement with the seat to block fluid flow through the outlet port. The vent valve assembly further includes a manually actuatable member for moving the valve member out of engagement with the seat to enable fluid to flow through the outlet port.

48 Claims, 4 Drawing Sheets

FLUID COUPLING HAVING VENT VALVE ASSEMBLY

BACKGROUND OF THE INVENTION

This invention relates to a new and improved coupling which is utilized to interconnect a pair of conduits. More specifically, the invention relates to a coupling having a vent valve assembly for venting fluid pressure from the coupling and from conduits connected with the coupling upon manual actuation of the vent valve assembly.

The present invention is usable, as one example, in connection with the filling of relatively small tanks for gas appliances using LP gas, such as outdoor grills. Such tanks are typically filled from a supply tank having a supply hose with a plug assembly on its end. An operator telescopically inserts the plug assembly into a socket assembly connected with the small tank.

The operator then opens a valve on the small tank and a valve at the supply tank. Gas flows from the supply tank, through the supply hose, through the interconnected plug and socket assemblies, and into the small tank. When the small tank has been filled with the desired amount of gas, the valve at the small tank is closed. The valve at the supply tank is also closed. Thereafter, the plug assembly is disconnected from the socket assembly.

At the time the plug assembly is disconnected from the socket assembly, high pressure fluid is still present in the supply hose, in the plug assembly, in the socket assembly, and in a conduit between the socket assembly and small tank valve. This high pressure fluid is vented to atmosphere upon disconnection of the plug assembly from the socket assembly. The venting of high pressure fluid creates a potentially hazardous situation if the fluid is flammable. The high pressure in the system also tends to rapidly expel the plug assembly from the socket assembly.

SUMMARY OF THE INVENTION

The present invention provides a new and improved apparatus which is advantageously used in filling a relatively small receiving tank from a relatively large supply tank. The apparatus includes a coupling which connects a pair of conduits in fluid communication. The conduits are connected with the supply and receiving tanks.

The coupling includes a plug assembly connected with one of the conduits and a socket assembly connected with the other conduit. The coupling includes a vent valve assembly which is manually actuatable to an open condition to vent fluid pressure in the plug and socket assemblies and the conduits. In the illustrated embodiment of the invention, the vent valve assembly is part of the plug assembly. However, the vent valve assembly could be part of the socket assembly if desired.

BRIEF DESCRIPTION OF THE DRAWINGS

The foregoing and other features of the present invention will become apparent to one skilled in the art to which the invention relates upon a consideration of the following description of the invention with reference to the accompanying drawings, wherein.

DESCRIPTION OF A PREFERRED EMBODIMENT

General Description

Figure 1:
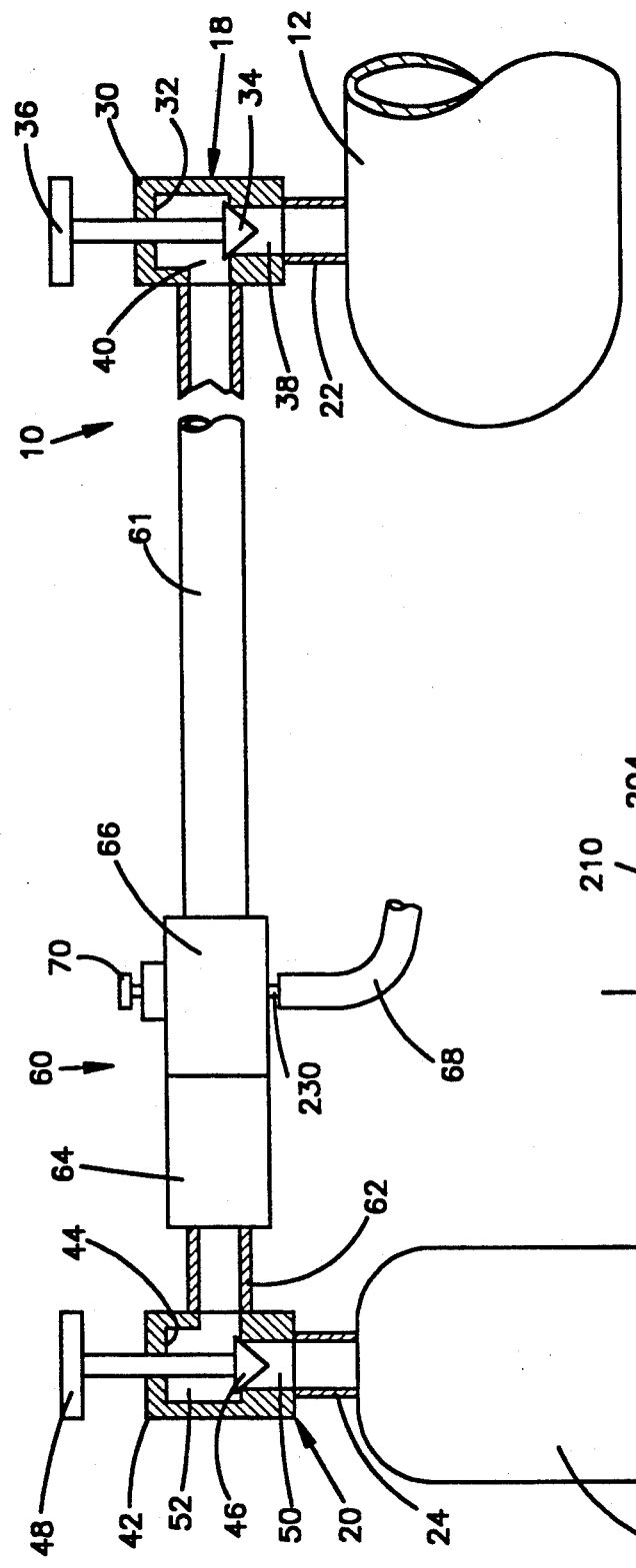
FIG. 1 is a schematic illustration of an apparatus in which a supply tank and a secondary tank are interconnected by conduits and an improved coupling.

An apparatus 10 (FIG. 1) includes a relatively large fluid supply tank 12 for supplying fluid under pressure, such as LP gas, to a relatively small secondary tank 14. A valve 18 for controlling the flow of fluid from the supply tank 12 is connected with the supply tank through a conduit 22. A valve 20 for controlling the flow of fluid to the secondary tank 14 is connected with the secondary tank through a conduit 24. It should be noted that the valves 18 and 20 could be mounted directly on the tanks 12 and 14 rather than being connected to them by the conduits 22 and 24.

The supply tank valve 18 includes a housing 30 having a fluid chamber 32 therein. A valve member 34 is movable within the fluid chamber 32 upon rotation of a handle 36. When the supply tank valve 18 is in a closed condition, shown in FIG. 1, the valve member 34 divides the chamber 32 into a first fluid chamber portion 38, in fluid communication with the interior of the supply tank 12, and a second fluid chamber portion 40.

Similarly, the secondary tank valve 20 includes a housing 42 having a fluid chamber 44 within which a valve member 46 is movable upon rotation of a handle 48. When the valve member 46 is in its closed condition, as illustrated in FIG. 1, the valve member 46 divides the fluid chamber 44 into a first fluid chamber portion 50, in fluid communication with the interior of the secondary tank 14, and a second fluid chamber portion 52.

An improved fluid coupling 60 interconnects a main supply conduit 61 extending from the supply tank valve 18 and a secondary conduit 62 extending from the secondary tank valve 20. The coupling 60 includes a socket assembly 64 which is connected with the secondary conduit 62. The coupling 60 also includes a plug assembly 66 which is connected with the main supply conduit 61. A vent conduit 68 extends from the plug assembly 66. In accordance with a feature of the invention, a vent valve assembly 70 in the plug assembly 66 is manually actuatable to vent fluid pressure from the coupling 60, conduits 61 and 62 and valves 18 and 20 to the vent conduit 68.

It should be noted that the positions of the plug assembly 66 and socket assembly 64 (FIG. 1) could be interchanged. If this was done, the socket assembly 64 would be connected with the conduit 61 and the plug assembly 66 would be connected with the conduit 62. Also, the vent valve assembly 70 could be located in the socket assembly 64 instead of in the plug assembly 66.

In order to fill the secondary tank 14 with fluid from the supply tank 12, the operator telescopically inserts the plug assembly 66 into the socket assembly 64. The operator then opens the secondary tank valve 20 and, thereafter, the supply tank valve 18. Fluid under pressure flows from the supply tank 12 to the secondary tank 14 through the conduit 61, coupling 60 and conduit 62. When the secondary tank 14 is filled, the operator closes the supply tank valve 18 and the secondary tank valve 20.

After closing the valves 18 and 20 and prior to disconnecting the coupling 60, the operator manually actuates the vent valve assembly 70 to vent high pressure fluid from the system. In accordance with one of the features of the invention, manual actuation of the vent valve assembly 70 vents fluid pressure from the plug and socket assemblies 64 and 66, conduits 61 and 62 and the chambers 40 and 52 in the valves 18 and 20.

Fluid conducted through the vent valve assembly 70 passes through the vent conduit 68 to a remote location for collection or disposal. After this has been done, the only high pressure fluid in the apparatus 10 is in the supply tank 12 and in the secondary tank 14, both of which are closed off by their respective valves 18 and 20. Thus, upon disconnection of the coupling 60, there is no hazardous or environmentally irresponsible venting of high pressure fluid to atmosphere.

Coupling—Plug Assembly

The plug assembly 66 (FIG. 2) includes a one-piece metal plug body 80 having a threaded trailing end portion 82 for connection to the main conduit 61 (FIG. 1). The plug assembly 66 has a leading end portion 86 (FIG. 2) for connection with the socket assembly 64. The leading end portion 86 includes a cylindrical nose portion 88 with an annular leading end surface 90, and a conical ramp portion 92 disposed axially inward of the nose portion 88. An annular groove 94 is disposed axially inward of the ramp portion 92.

The plug body 80 has a cylindrical outer surface 100 and a plurality of interconnected cylindrical and conical internal surfaces which define a continuous fluid flow passage 102 extending the length of the plug assembly 66. These internal surfaces include, among others, a cylindrical surface 108 which forms an inlet to the fluid flow passage 102, a cylindrical surface 110 in a portion of the plug body 80 in which the vent valve assembly 70 is located, a conical surface 118 adjacent the groove 94, and a cylindrical surface 120 extending axially through the leading end portion 86 of the plug body 80. The cylindrical surface 120 and leading end surface 90 form an outlet 122 end of the fluid flow passage 102.

The plug assembly 66 (FIG. 2) includes a check valve assembly 130 for blocking fluid flow through the passage 102 when the plug assembly is not connected to the socket assembly 64. The check valve assembly 130 includes a movable check valve member 132 disposed in the fluid flow passage 102. The check valve member 132 has a truncated cone-shaped main body portion 134 and an actuator portion 136. The actuator portion 136 has three radially extending blades spaced about 120° apart around the central axis of the check valve assembly.

A coil compression spring 140 biases the check valve body portion 134 into abutting engagement with the conical surface 118 on the plug body 80 to block fluid flow through the passage 102. A leak-down small orifice 142 in the check valve body portion 134 prevents buildup of excessive fluid pressure in the plug assembly 66. When the check valve member 132 is moved in the direction of the arrow 144 from the closed position shown in FIG. 2 to the open position shown in FIG. 3, fluid can flow through the passage 102 in the plug assembly 66.

The plug body 80 and the check valve assembly 130 have the same general construction as a Series 5-LP Plug Assembly which is commercially available from Tuthill Corporation, Hansen Coupling Division, having a place of business at Berea, Ohio. It should be understood that a vent valve assembly, corresponding to the vent valve assembly 70, was not commercially available with the Series 5-LP Plug Assembly prior to the present invention. It should also be understood that the plug body 80 and check valve assembly 130 may have a construction which is different than the specific construction described herein.

Coupling—Socket Assembly

The socket assembly 64 (FIG. 3) includes a one-piece metal socket body 150 having a fluid flow passage 152 extending therethrough. The socket body 150 has a threaded end portion 154 for connection with the secondary conduit 62. An annular elastomeric seal member 156 is disposed within the socket body 150.

Disposed within a socket end portion 158 is a check valve assembly 160. The check valve assembly 160 includes a movable check valve member 162 and a coil biasing spring 164. The coil spring 164 in the socket assembly 64 is stronger than the coil spring 140 (FIG. 2) in the plug assembly 66. The check valve member 162 (FIG. 3) includes a circular body portion 166 and a flat, generally rectangular, blade actuator portion 168 having a rectangular axial end surface 170.

The elastomeric seal member 156 has an annular radially extending surface 172 which forms a seat for the check valve body portion 166. The check valve body portion 166 has an annular surface 173 which is urged into engagement with the seat 172 by the spring 164 to block fluid flow through the passage 152 in the socket assembly 64. When the check valve member 164 is in the open position shown in FIG. 3, fluid can flow through the passage 152 in the socket assembly 64.

The socket assembly 64 has the same construction as a Series 5-LP Socket Assembly which is commercially available from Tuthill Corporation, Hansen Coupling Division, having a place of business at Berea, Ohio. It should be understood that the socket assembly 64 may have a construction which is different than the specific construction described herein.

Coupling—Connection

To interconnect the socket assembly 64 and the plug assembly 66, a cylindrical locking sleeve 180 in the socket assembly 64 is retracted. As the locking sleeve 180 is retracted, it moves toward the left, as viewed in FIG. 3, against the influence of a coil biasing spring 182. Retraction of the locking sleeve 180 releases spherical metal locking elements or balls 184 for movement radially outward relative to the socket body 150. After the locking sleeve 180 has been retracted to release the locking elements 184, the plug assembly 66 can be telescopically inserted into the socket assembly 64.

As the plug assembly 66 is inserted into the socket assembly 64, the ramp portion 92 on the plug body 80 engages the locking elements 184 and forces them radially outward. Continued movement of the plug assembly 66 into the socket assembly 64 moves the annular groove 94 into radial alignment with the locking elements 184. The sleeve 180 is then released to force the locking elements 184 into the groove 94 to retain the plug assembly 66 in the socket assembly 64. Although it is preferred to use the spherical locking elements or balls 184 to hold the plug assembly 66 in the socket assembly 64, it is contemplated that cylindrical pins or other known types of locking elements could be used if desired.

As the plug assembly 66 is inserted into the socket assembly 64, the end surface 138 on the plug assembly check valve actuator 136 engage the end surface 170 of the socket assembly check valve actuator 168. The check valve assembly 160 in the socket assembly 64 remains closed under the influence of the relatively strong biasing spring 164 while the check valve assembly 130 in the plug assembly opens. The leading end surface 90 of the plug assembly 66 then engages the actuator 168. The axial force transmitted between the plug body 80 and the check valve assembly 168 moves the check valve assembly 168 to the open position shown in FIG. 3. As this occurs, the leading end surface 90 of the plug assembly 66 moves into sealing engagement with the annular elastomeric seal member 156. The elastomeric seal member 156, along with an O-ring 188 disposed within the socket body 150, blocks fluid flow between the outside of the plug body 80 and the socket housing 150.

Vent Valve Assembly

In accordance with a feature of the present invention, the vent valve assembly 70 is provided in association with the plug and socket assemblies 64 and 66 to vent fluid pressure in a safe manner. The vent valve assembly 70 (FIG. 2) includes a vent valve mounting body 200 having a hexagonal head portion 202 projecting radially outward of the outer surface 100 of the plug body 80. The vent valve mounting body 200 has a hollow cylindrical main portion 204 threaded into the plug body 80. An O-ring 206 provides a seal between the vent valve mounting body 200 and the plug body 80.

A cylindrical central passage 210 (FIG. 2) extends through the vent valve mounting body 200 along a central axis 212 of the vent valve assembly 70. A cylindrical inlet passage 214 extends diametrically through the main body portion 204. The inlet passage 214 has a central axis which may be coincident with a central axis 216 of the fluid flow passage 102 through the plug body 80 and the fluid flow passage 152 (FIG. 3) through the socket body 150. The central axis 212 of the vent valve assembly 70 extends perpendicular to the central axis 216 of the fluid flow passages 102 and 152.

A manually engageable vent valve actuator member 220 (FIG. 2) is slidably connected with the vent valve mounting body 200. The vent valve actuator member 220 includes a circular pushbutton portion 222 disposed radially outward of the head portion 202 of the vent valve mounting body 200. A cylindrical stem portion 224 of the actuator member 220 is slidably received in the central passage 210 in the mounting body 200. An O-ring 226 seals a joint between the vent valve mounting body 200 and the vent valve actuator member 220.

The vent valve assembly 70 includes a hose stem 230 the which extends radially outward from the plug body 80 on a side of the plug body diametrically opposite from the pushbutton 222. An annular snap ring 232 secures the hose stem 230 to the plug body 80. A vent passage 234 extends axially through the hose stem 230 along the central axis 212 of the vent valve assembly 70 in a direction transverse to the fluid flow path through the passage 102 in the plug assembly 66.

The vent valve assembly 70 has an outlet port defined by a vent valve seat member 240. The valve seat member 240 is secured in the plug assembly 66 between an annular inner surface 242 on the hose stem 230 and an annular end surface 244 on the vent valve mounting body 200. The valve seat member 240 has an annular vent valve outlet 246 (best seen in FIG. 5) which forms a valve seat. An O-ring 250 seals a joint between the vent valve seat member 240 and the plug body 80.

A movable vent valve member 248 (FIG. 2) has an end portion 252 which is threaded into the stem portion 224 of the actuator member 220. The opposite end portion 254 of the movable vent valve member 248 is disposed in a cylindrical chamber 256 (FIG. 5) within the valve seat member 240. The cylindrical end portion 254 of the movable vent valve member 248 has a screwdriver slot 258.

A helical compression spring 260 (FIG. 2) within the central passage 210 extends between the valve seat member 240 and the actuator stem 224. The spring 260 biases the actuator stem 224 and the vent valve member 248 upwardly, as viewed in FIG. 2, to the closed position. When the vent valve member 248 is in the closed position, a valve surface 264 on the movable vent valve member 248 is biased into abutting engagement with the vent valve outlet 246 to block fluid flow through the vent valve assembly 70.

A cylindrical portion 266 of the movable vent valve member 248 extends axially from the vent valve inlet passage 214 to the valve surface 264 and has a reduced diameter. Radially inner surfaces 268 (FIG. 4) of the spring 260 cooperate with the portion 266 of the vent valve member 248 to form an annular passage 210 in the vent valve mounting body 204. Radially outer surfaces 272 of the spring 260 are in engagement with a cylindrical inner surface 274 of the vent valve mounting body 204.

Figure 4:
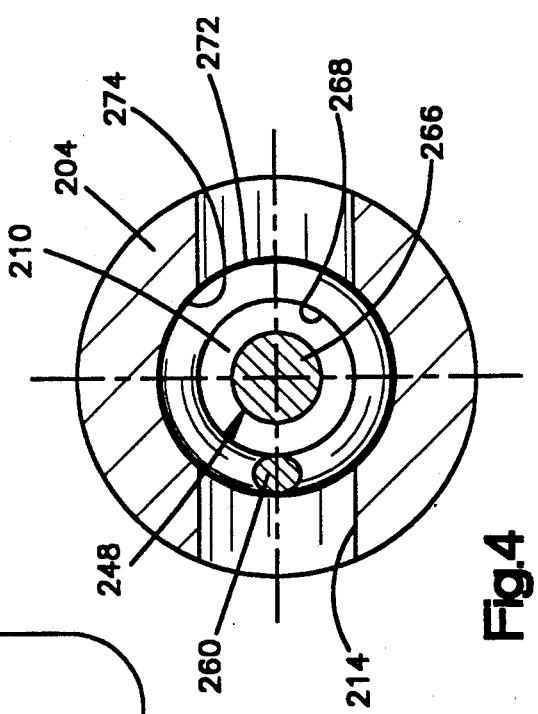
FIG. 4 is an enlarged sectional view, with parts removed, taken along line 4—4 of FIG. 2.
Figure 5:
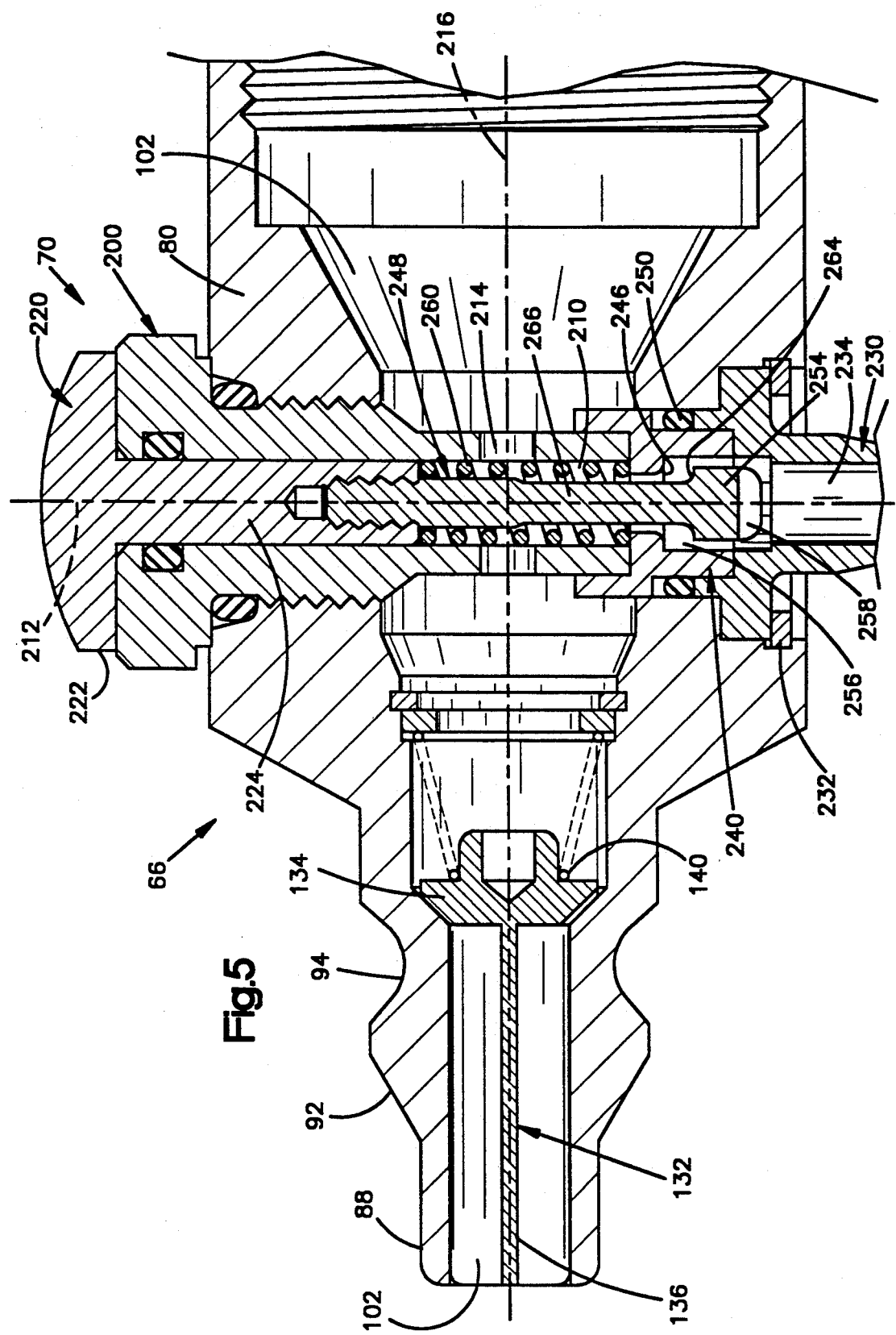
FIG. 5 is a sectional view, similar to FIG. 2, showing the vent valve assembly in an actuated or open condition.

The surface 274 and the valve member portion 266 define between them space through which fluid can flow along the length of the valve member portion 266 when the vent valve member 248 is in the open position of FIG. 5. Thus, the fluid flows from the inlet passage 214 between coils of the spring 260 to the central portion of the spring (FIG. 4). The fluid then flows downwardly (as viewed in FIG. 5) through the vent valve outlet 246.

Operation of Vent Valve Assembly

Figure 2:
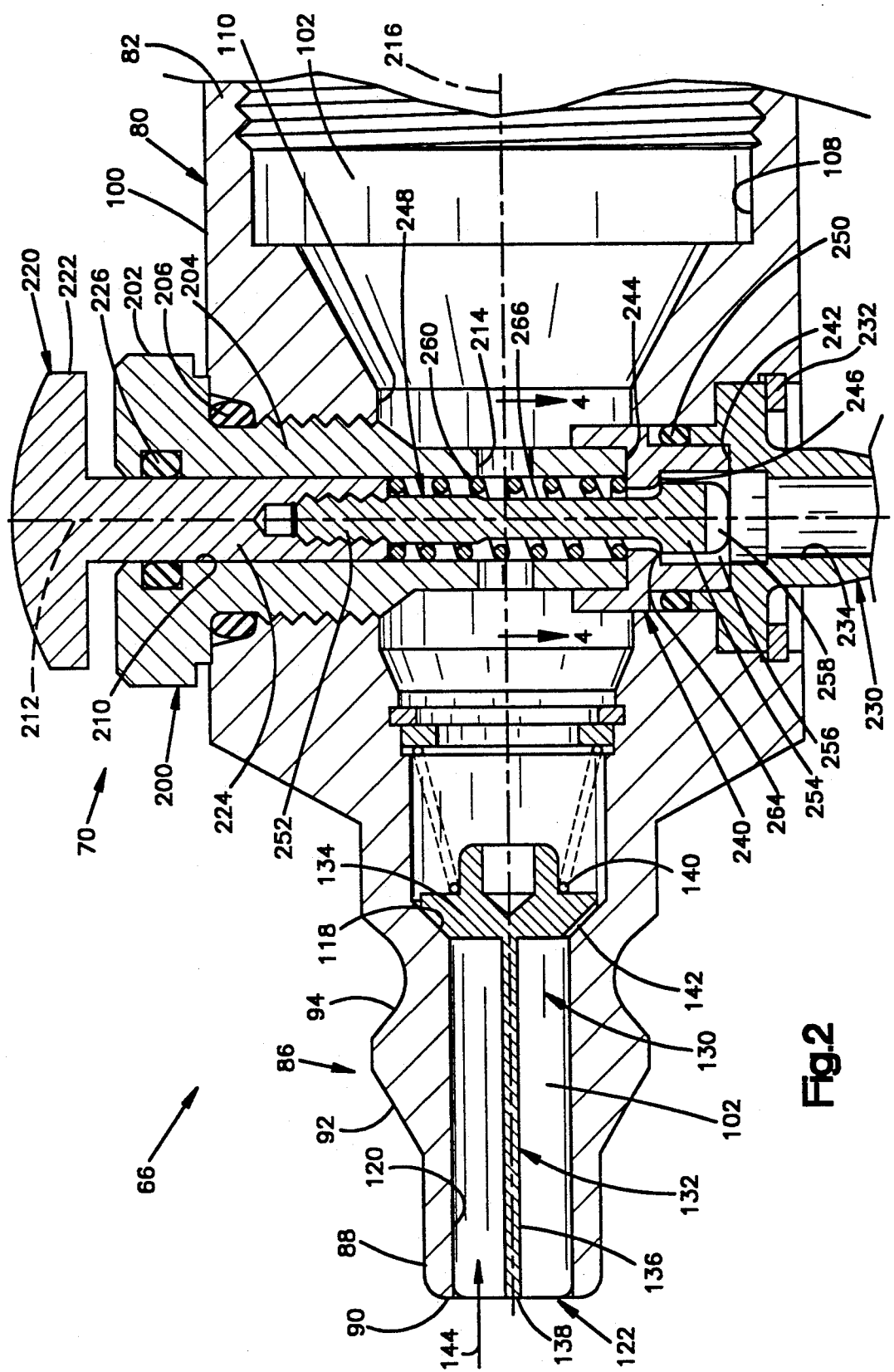
FIG. 2 is an enlarged sectional view of an improved plug assembly which forms part of the coupling of FIG. 1 and has a vent valve assembly.
Figure 3:
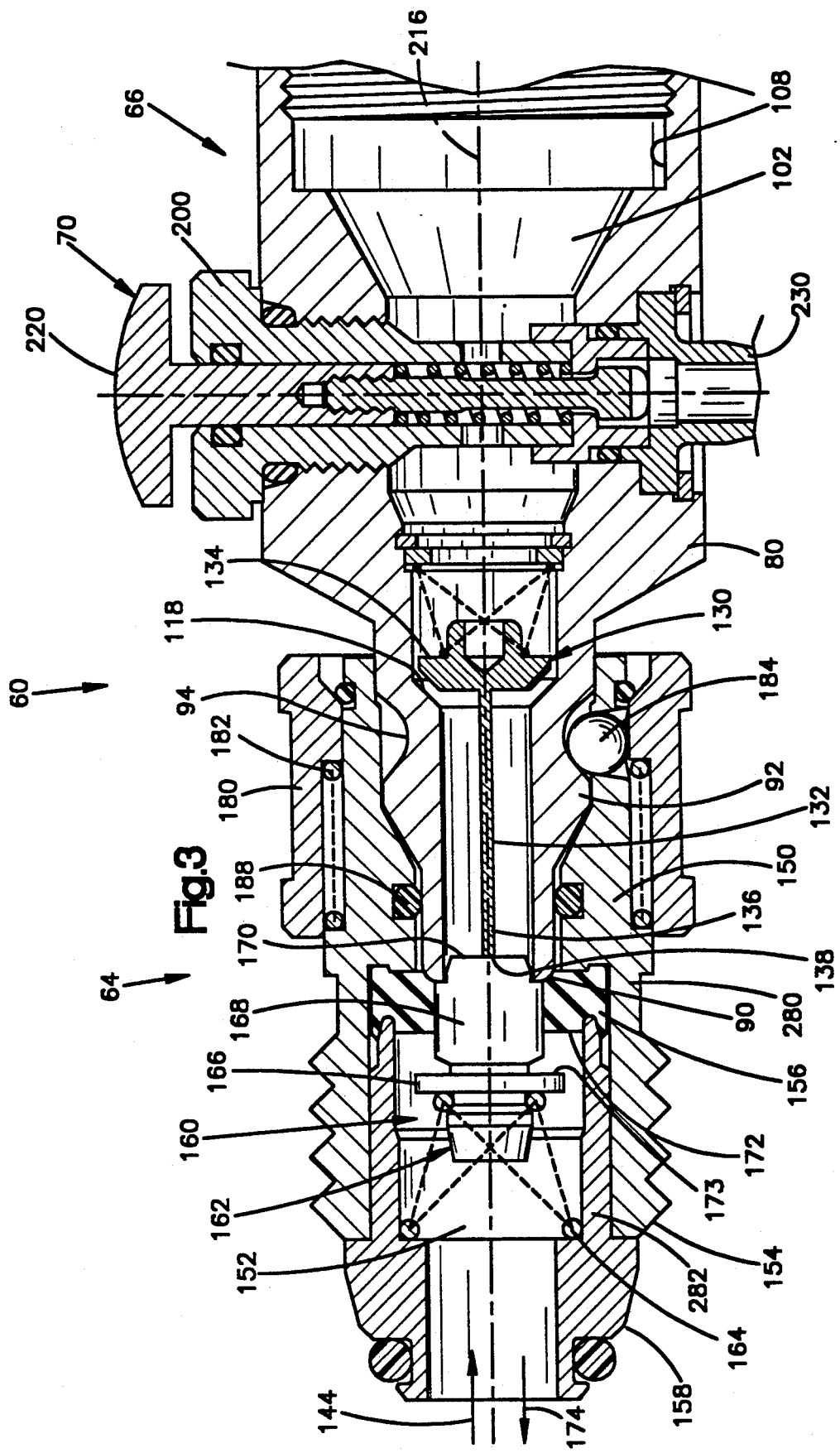
FIG. 3 is an enlarged sectional view of the coupling of FIG. 1 showing the plug assembly of FIG. 2 telescopically received in a socket assembly.

When the vent valve assembly 70 is not actuated, the vent valve actuator member 220 and the movable vent valve member 248 are in the closed position illustrated in FIG. 2. The valve surface 264 on the movable valve member 248 is in abutting engagement with the vent valve outlet 246, blocking fluid flow from of the vent valve assembly 70. The valve surface 264 is pressed against the outlet 246 under the combined effect of the biasing spring 260 and fluid pressure applied against the larger diameter stem portion 224.

To actuate the vent valve assembly 70 to vent fluid under pressure from the apparatus 10 (FIG. 1) after the valves 18 and 20 have been closed, the operator manually presses against the pushbutton portion 222 of the vent valve actuator 220. This moves the actuator 220 and the movable valve member 248 along the axis 212 in a direction transverse to the fluid flow path through the passage 102 in the plug assembly 66, from the closed position illustrated in FIG. 2 to the open position illustrated in FIG. 5.

In the open position, the valve surface 264 is spaced from the valve outlet 246 (FIG. 5). At this time, the vent passage 234 in the hose stem 230 is in fluid communication with the inlet passage 214. The inlet passage 214 is connected in fluid communication with the closed valves 18 and 20 (FIG. 1 through the coupling 60 and conduits 61 and 62. Therefore, the fluid chamber portion 40 (FIG. 1) of the closed supply valve 18 and the main supply conduit 61 are in fluid communication with the vent valve outlet 246 through the fluid flow passage 102 in the plug body 80. The fluid chamber portion 52 in the closed secondary valve 20 and the secondary conduit 62 are in fluid communication with the vent valve outlet 246 through the fluid flow passage 152 in the socket assembly 64. Fluid can flow from the plug assembly fluid passage 102 and the socket assembly fluid passage 152 through the vent valve inlet passage 214, between the movable vent valve member 248 and the mounting body 200, through the vent valve outlet 246 and past the valve surface 264 the vent passage 234 in the hose stem 230. The fluid then flows outwardly through the vent conduit 68 to a remote location. If desired, a nozzle or muffler could be provided in place of the vent conduit 68.

Thus, it can be seen that when the vent valve assembly 70 is actuated, with the plug assembly 66 and socket assembly 64 coupled, fluid can be exhausted from all portions of the system 10 between the supply valve member 34 and the secondary valve member 46. Since no high pressure fluid remains in the system 10 including the coupling 60, there is no danger of a violent expulsion of the plug assembly 66 from the socket assembly 64 upon decoupling thereof. Also, there is no escape of a large quantity of fluid under pressure from the system 10 upon disconnection of the plug assembly 66 from the socket assembly 64.

In the illustrated embodiment of the invention, the vent valve assembly 70 is part of the plug assembly 66. However, it is contemplated that the vent valve assembly 70 could be part of the socket assembly 64 if desired. If the vent valve assembly is to be part of the socket assembly 64, the socket body 150 would be extended toward the left (as viewed in FIG. 3) to increase the axial extent of a cylindrical portion 280 of the socket body. The axial extent of a cylindrical side wall 282 of the socket end portion 158 would also be increased to the left (as viewed in FIG. 3) of the spring 164. This would provide a location to mount the vent valve assembly 70 on the socket body 150 downstream (to the left as viewed in FIG. 3) of the check valve assembly 160. The vent valve assembly 70 would then be disposed on the socket body 150 at a location between the threads 154 and sleeve 180.

SUMMARY

In view of the foregoing description, it is apparent that the present invention provides a new and improved apparatus 10 which is advantageously used in filling a relatively small receiving tank 14 from a relatively large supply tank 12. The apparatus 10 includes a coupling 60 which connects a pair of conduits 61 and 62 in fluid communication. The conduits 61 and 62 are connected with the supply and receiving tanks 12 and 14.

The coupling 60 includes a plug assembly 66 connected with the conduits 61 and a socket assembly 64 connected with the conduit 62. The coupling 60 also includes a vent valve assembly 70 which is manually actuatable to an open condition (FIG. 5) to vent fluid pressure in the plug and socket assemblies 64 and 66 and the conduits 61 and 62. In the illustrated embodiment of the invention, the vent valve assembly 70 is part of the plug assembly 66. However, the vent valve assembly 70 could be part of the socket assembly 64 if desired.

We claim:

1. A coupling for use in connecting a pair of conduits in fluid communication, said coupling comprising a plug assembly having a fluid flow passage therethrough and being adapted to be connected with one of the conduits and a socket assembly having a fluid flow passage therethrough and being adapted to be connected with another of the conduits, a first one of said plug and socket assemblies including vent valve means for venting of fluid pressure in said first one of said assemblies, said vent valve means including a valve member movable between an open position enabling fluid to flow through a vent valve outlet and a closed position blocking fluid flow through the vent valve outlet, and manually actuatable means for moving said valve member from the closed position to the open position to enable fluid to flow through the vent valve outlet, said first one of said assemblies including a second valve member disposed in the fluid flow passage in said first one of said assemblies, biasing means for urging said second valve member toward a first position blocking fluid flow through the fluid flow passage in said first one of said assemblies, said second valve member being movable from the first position to a second position enabling fluid to flow through the fluid flow passage in said first one of said assemblies, and means connected with said second valve member for engaging a second one of said plug and socket assemblies to move said second valve member from the first position to the second position against the influence of said biasing means to enable fluid to flow through the fluid flow passage in said first one of said assemblies.

2. A coupling as set forth in claim 1, wherein said vent valve means includes surface means for directing fluid flow through the vent valve outlet in a direction transverse to the fluid flow passage in said first one of said assemblies.

3. A coupling as set forth in claim 1 further including conduit means connected in fluid communication with said vent valve means for conducting fluid from said vent valve means to a location remote from said coupling.

4. A coupling as set forth in claim 1 wherein said plug and socket assemblies are interconnectable to enable fluid to flow from one of the conduits through said plug and socket assemblies to the other conduit along the fluid flow passages in said plug and socket assemblies, said valve member being movable from the closed position toward the open position in a direction transverse to the direction of fluid flow through said plug and socket assemblies.

5. A coupling as set forth in claim 1 wherein said vent valve means includes a vent valve body at least partially disposed in the fluid flow passage in said first one of said assemblies and having surface means for defining a vent valve inlet in the fluid flow passage in said first one of said assemblies for enabling fluid to flow into said vent valve means.

6. A coupling as set forth in claim 5 wherein said first one of said assemblies includes a body portion connected with said one of the conduits, said vent valve body being connected with said body portion, said valve member being movable in said vent valve body between the open position and the closed position, said vent valve means including a valve seat connected with said vent valve body, said valve member being disposed in engagement with said valve seat when said valve member is in the closed position.

7. A coupling as set forth in claim 1 wherein said one of said assemblies includes a main opening through which fluid flow is conducted between said plug and socket assemblies, said main opening having a central axis which extends transversely to a central axis of said vent outlet.

8. A coupling as set forth in claim 1 wherein said one of said assemblies includes a main opening through which fluid flow is conducted between said plug and socket assemblies, said main opening being spaced from said vent outlet.

9. A coupling for use in connecting a pair of conduits in fluid communication, said coupling comprising a plug assembly having a fluid flow passage therethrough and being adapted to be connected with one of the conduits and a socket assembly having a fluid flow passage therethrough and being adapted to be connected with another of the conduits, a first one of said plug and socket assemblies including vent valve means for venting of fluid pressure in said first one of said assemblies, said vent valve means including a valve member movable between an open position enabling fluid to flow through a vent valve outlet and a closed position blocking fluid flow through the vent valve outlet, and manually actuatable means for moving said valve member from the closed position to the open position to enable fluid to flow through the vent valve outlet, said manually actuatable means for moving said valve member includes a manually engageable surface connected with said valve member and movable in a direction transverse to the fluid flow path through said fluid flow passage in said first one of said assemblies to move said valve member from the closed position toward the open position.

10. A coupling as set forth in claim 9 wherein said vent valve means includes a vent valve body at least partially disposed in the fluid flow passage in said first one of said assemblies and having surface means for defining a vent valve inlet in the fluid flow passage in said first one of said assemblies for enabling fluid to flow into said vent valve means.

11. A coupling as set forth in claim 10 wherein said first one of said assemblies includes a body portion connected with said one of the conduits, said vent valve body being connected with said body portion, said valve member being movable in said vent valve body between the open position and the closed position, said vent valve means including a valve seat connected with said vent valve body, said valve member being disposed in engagement with said valve seat when said valve member is in the closed position.

12. A coupling as set forth in claim 9, wherein said vent valve means includes surface means for directing fluid flow through the vent valve outlet in a direction transverse to the fluid flow passage in said first one of said assemblies.

13. A coupling as set forth in claim 9 wherein said first one of said assemblies includes a second valve member disposed in the fluid flow passage in said first one of said assemblies, biasing means for urging said second valve member toward a first position blocking fluid flow through the fluid flow passage in said first one of said assemblies, said second valve member being movable from the first position to a second position enabling fluid to flow through the fluid flow passage in said first one of said assemblies, and means connected with said second valve member for engaging a second one of said plug and socket assemblies to move said second valve member from the first position to the second position against the influence of said biasing means to enable fluid to flow through the fluid flow passage in said first one of said assemblies.

14. A coupling as set forth in claim 9 further including conduit means connected in fluid communication with said vent valve means for conducting fluid from said vent valve means to a location remote from said coupling.

15. A coupling as set forth in claim 9 wherein said plug and socket assemblies are interconnectable to enable fluid to flow from one of the conduits through said plug and socket assemblies to the other conduit along the fluid flow passages in said plug and socket assemblies, said valve member being movable from the closed position toward the open position in a direction transverse to the direction of fluid flow through said plug and socket assemblies under the influence of force applied against said manually engageable surface.

16. A coupling as set forth in claim 9 wherein said one of said assemblies includes a main opening through which fluid flow is conducted between said plug and socket assemblies, said main opening having a central axis which extends transversely to a central axis of said vent outlet.

17. A coupling as set forth in claim 9 wherein said vent valve means includes a vent valve body having a passage in which said valve member is movable between the open position and the closed position, a valve seat connected with said vent valve body, said valve member being disposed in engagement with said valve seat when said valve member is in the closed position.

18. Apparatus comprising a supply tank, first flow control valve means connected with said supply tank for controlling fluid flow from said supply tank, said first flow control valve means being operable between an open condition and a closed condition blocking fluid flow from said supply tank, first conduit means connected with said first flow control valve means, a secondary tank, second flow control valve means connected with said secondary tank for controlling fluid flow to and from said secondary tank, said second flow control valve means being operable between an open condition and a closed condition blocking fluid flow to and from said secondary tank, second conduit means connected with said second flow control valve means, and coupling means for interconnecting said first and second conduit means, said coupling means including a plug assembly having a fluid flow passage therethrough and connected with one of said first and second conduit means, a socket assembly having a fluid flow passage therethrough and connected with the other of said first and second conduit means, said socket assembly telescopically receiving said plug assembly to connect said socket assembly and said plug assembly with each other and thereby place said first conduit means in fluid communication with said second conduit means, and vent valve means for venting fluid pressure in said first and second conduit means and in said coupling means when said first and second flow control valve means are in the closed condition.

19. An apparatus as set forth in claim 18 wherein said first flow control valve includes a valve body defining a fluid chamber therein and a valve member movable relative to said first valve body, said first valve member dividing said fluid chamber into a first chamber portion connected in fluid communication with said first conduit means and a second chamber portion connected in fluid communication with said supply tank when said first flow control valve means is in the closed condition, said vent valve means being in fluid communication with said first chamber portion through said first conduit means to enable fluid pressure in said first chamber portion of the fluid chamber in said first flow control valve means to be vented when said first and second flow control valve means are in the closed condition.

20. An apparatus as set forth in claim 19 wherein said second flow control valve means includes a second valve body defining a fluid chamber therein and a second valve member movable relative to said second valve body, said second valve member dividing said fluid chamber in said second valve body into a first chamber portion connected in fluid communication with said second conduit means and a second chamber portion connected in fluid communication with said secondary tank when said second flow control valve means is in the closed condition, said vent valve means being in fluid communication with the first chamber portion of the fluid chamber in said second valve body through said second conduit means to enable fluid pressure in the first chamber portion of the fluid chamber in said second valve body to be vented when said first and second flow control valve means are in the closed condition.

21. An apparatus as set forth in claim 18 wherein said coupling includes a plurality of locking elements which move radially relative to a circular side surface of a socket body portion of said socket assembly and a sleeve which circumscribes said locking elements to hold said locking elements in abutting engagement with an annular and radially outwardly opening recess formed in a plug body portion of said plug assembly, said sleeve being movable axially relative to said socket body portion to move said locking elements radially outwardly out of said recess to allow disconnection of said plug assembly from said socket assembly.

22. Apparatus as set forth in claim 18 including check valve means for controlling the flow of fluid through said socket assembly, said check valve means being actuated from a closed condition to an open condition upon connection of said plug assembly with said socket assembly.

23. Apparatus as set forth in claim 18 wherein said coupling means includes a main opening through which fluid flow is conducted between said plug and socket assemblies when said plug and socket assemblies are interconnected, said main opening having a central axis which extends transversely to a central axis of an outlet in said vent valve means.

24. A coupling as set forth in claim 18 wherein said vent valve means includes a seat having surface means for at least partially defining a vent outlet, a vent valve body having a passage in which is received a valve member movable between an open position enabling fluid to flow through the vent outlet and a closed position blocking fluid flow through the vent outlet, and spring means for biasing said valve member into abutting engagement with said seat when said valve member is in the closed position to block fluid flow through the vent outlet.

25. A coupling for use in connecting a pair of conduits in fluid communication, said coupling comprising a plug assembly having a fluid flow passage therethrough and being adapted to be connected with one of the conduits and a socket assembly having a fluid flow passage therethrough and being adapted to be connected with another of the conduits, a first one of said plug and socket assemblies including vent valve means for venting of fluid pressure in said first one of said assemblies, said vent valve means including a valve member movable between an open position enabling fluid to flow through a vent valve outlet and a closed position blocking fluid flow through the vent valve outlet, and manually actuatable means for moving said valve member from the closed position to the open position to enable fluid to flow through the vent valve outlet, said vent valve means includes a vent valve body having a passage in which said valve member is movable between the open position and the closed position, a valve seat connected with said vent valve body, said valve member being disposed in engagement with said valve seat when said valve member is in the closed position, and spring means for biasing said valve member into abutting engagement with said valve seat when said valve member is in the closed position.

26. A coupling as set forth in claim 25 wherein said vent valve body includes surface means for defining a vent valve inlet in fluid communication with the passage in said vent valve body at a central portion of the fluid flow passage through said first one of said assemblies.

27. A coupling as set forth in claim 25, wherein said vent valve means includes surface means for directing fluid flow through the vent valve outlet in a direction transverse to the fluid flow passage in said first one of said assemblies.

28. A coupling as set forth in claim 25 wherein said first one of said assemblies includes a second valve member disposed in the fluid flow passage in said first one of said assemblies, biasing means for urging said second valve member toward a first position blocking fluid flow through the fluid flow passage in said first one of said assemblies, said second valve member being movable from the first position to a second position enabling fluid to flow through the fluid flow passage in said first one of said assemblies, and means connected with said second valve member for engaging a second one of said plug and socket assemblies to move said second valve member from the first position to the second position against the influence of said biasing means to enable fluid to flow through the fluid flow passage in said first one of said assemblies.

29. A coupling as set forth in claim 25 further including conduit means connected in fluid communication with said vent valve means for conducting fluid from said vent valve means to a location remote from said coupling.

30. A coupling as set forth in claim 25 wherein said plug and socket assemblies are interconnectable to enable fluid to flow from one of the conduits through said plug and socket assemblies to the other conduit along the fluid flow passages in said plug and socket assemblies, said valve member being movable from the closed position toward the open position in a direction transverse to the direction of fluid flow through said plug and socket assemblies.

31. A coupling for use in connecting a pair of conduits in fluid communication, said coupling comprising a plug assembly having a fluid flow passage therethrough and being adapted to be connected with one of the conduits and a socket assembly having a fluid flow passage therethrough and being adapted to be connected with another of the conduits, a first one of said plug and socket assemblies including vent valve means for venting of fluid pressure in said first one of said assemblies, said vent valve means including a valve member movable between an open position enabling fluid to flow through a vent valve outlet and a closed position blocking fluid flow through the vent valve outlet, and manually actuatable means for moving said valve member from the closed position to the open position to enable fluid to flow through the vent valve outlet, said socket assembly includes a socket body, a plurality of locking elements which move radially relative to a circular side surface of said socket body and a sleeve which circumscribes said locking elements to hold said locking elements in abutting engagement with an annular and radially outwardly opening recess formed in said plug assembly, said sleeve being movable axially relative to said socket body to enable said locking elements to move radially outwardly out of said recess to allow disconnection of said plug assembly from said socket assembly.

32. A coupling as set forth in claim 31 wherein said vent valve means is in said plug assembly.

33. A coupling as set forth in claim 31 wherein said vent valve means is in said socket assembly.

34. A coupling as set forth in claim 31, wherein said vent valve means includes surfaces means for directing fluid flow through the vent valve outlet in a direction transverse to the fluid flow passage in said first one of said assemblies.

35. A coupling as set forth in claim 31 wherein said first one of said assemblies includes a second valve member disposed in the fluid flow passage in said first one of said assemblies, biasing means for urging said second valve member toward a first position blocking fluid flow through the fluid flow passage in said first one of said assemblies, said second valve member being movable from the first position to a second position enabling fluid to flow through the fluid flow passage in said first one of said assemblies, and means connected with said second valve member for engaging a second one of said plug and socket assemblies to move said second valve member from the first position to the second position against the influence of said biasing means to enable fluid to flow through the fluid flow passage in said first one of said assemblies.

36. A coupling as set forth in claim 31 further including conduit means connected in fluid communication with said vent valve means for conducting fluid from said vent valve means to a location remote from said coupling.

37. A coupling as set forth in claim 31 wherein said plug and socket assemblies are interconnectable to enable fluid to flow from one of the conduits through said plug and socket assemblies to the other conduit along the fluid flow passages in said plug and socket assemblies, said valve member being movable from the closed position toward the open position in a direction transverse to the direction of fluid flow through said plug and socket assemblies.

38. A coupling as set forth in claim 31 wherein said manually actuatable means for moving said valve member includes a manually engageable surface connected with said valve member and movable in a direction transverse to the fluid flow path through said fluid flow passage in said first one of said assemblies to move said valve member from the closed position toward the open position.

39. A coupling as set forth in claim 31 wherein said vent valve means includes a vent valve body at least partially disposed in the fluid flow passage in said first one of said assemblies and having surface means for defining a vent valve inlet in the fluid flow passage in said first one of said assemblies for enabling fluid to flow into said vent valve means.

40. A coupling as set forth in claim 31 wherein said first one of said assemblies includes a body portion connected with said one of the conduits, said vent valve body being connected with said body portion, said valve member being movable in said vent valve body between the open position and the closed position, said vent valve means including a valve seat connected with said vent valve body, said valve member being disposed in engagement with said valve seat when said valve member is in the closed position.

41. A coupling as set forth in claim 31 wherein said one of said assemblies includes a main opening through which fluid flow is conducted between said plug and socket assemblies, said main opening having a central axis which extends transversely to a central axis of said vent outlet.

42. A coupling as set forth in claim 31 wherein said one of said assemblies includes a main opening through which fluid flow is conducted between said plug and socket assemblies, said main opening being spaced from said vent outlet.

43. A coupling as set forth in claim 31 wherein said vent valve means includes a vent valve body having a passage in which said valve member is movable between the open position and the closed position, a valve seat connected with said vent valve body, said valve member being disposed in engagement with said valve seat when said valve member is in the closed position, and spring means for biasing said valve member into abutting engagement with said valve seat when said valve member is in the closed position.

44. A coupling as set forth in claim 43 wherein said vent valve body includes surface means for defining a vent valve inlet in fluid communication with the passage in said vent valve body at a central portion of the fluid flow passage through said first one of said assemblies.

45. A plug assembly for engagement with a socket assembly of a plug and socket coupling to connect a pair of conduits in fluid communication, said plug assembly comprising a plug body having a fluid flow passage therethrough and vent valve means connected with said plug body for venting of fluid pressure in said plug assembly, said vent valve means including a vent valve member movable relative to said plug body between an open position enabling fluid to flow through a vent outlet and a closed position blocking fluid flow through the vent outlet, and manually actuatable means for moving said vent valve member relative to said plug body from the closed position to the open position to enable fluid to flow through the vent outlet, said vent valve means includes a vent valve body having a passage in which said vent valve member is movable between the open position and the closed position, a valve seat connected with said vent valve body, said vent valve member being disposed in engagement with said valve seat when said vent valve member is in the closed position, and spring means for biasing said vent valve member into engagement with said vent valve seat when said vent valve member is in the closed position.

46. A plug assembly as set forth in claim 45, wherein said vent valve means includes surface means for directing fluid flow through the vent outlet in a direction transverse to a longitudinal axis of the fluid flow passage in said plug body.

47. A plug assembly as set forth in claim 45 including conduit means connected in fluid communication with said vent valve means for conducting fluid from said vent valve means to a location remote from said plug assembly.

48. A plug assembly as set forth in claim 45 wherein said vent valve body includes surface means for defining a vent valve inlet in fluid communication with the passage in said vent valve body at a central portion of the fluid flow passage through said plug body.

* * * * *